United States Patent [19]

Koseki et al.

[11] Patent Number: 5,402,249
[45] Date of Patent: Mar. 28, 1995

[54] INTEGRATED CIRCUIT WITH EXTERIOR GAIN CONTROL ADJUSTMENT

[75] Inventors: Junichi Koseki, Kawasaki; Hajime Nakamura; Jun Sakakibara, both of Tokyo, all of Japan

[73] Assignee: Kabushiki Kaisha Toshiba, Kawasaki, Japan

[21] Appl. No.: 124,195

[22] Filed: Sep. 21, 1993

[30] Foreign Application Priority Data

Sep. 24, 1992 [JP] Japan .................. 4-280685

[51] Int. Cl.⁶ ............................................. H04N 1/40
[52] U.S. Cl. ............................... 358/446; 358/443; 358/445; 348/255; 348/678
[58] Field of Search ............... 348/255, 678, 572, 257; 358/443, 446, 461, 445; 250/208.1

[56] References Cited

U.S. PATENT DOCUMENTS

| | | | |
|---|---|---|---|
| 4,525,741 | 6/1985 | Chahal et al. | 358/446 |
| 4,748,677 | 5/1988 | Yokomizo | 358/446 |
| 4,884,129 | 11/1989 | Ozawa et al. | 348/257 |
| 5,079,623 | 1/1992 | Sendelweck et al. | 348/678 |
| 5,206,501 | 4/1993 | Sakakibara et al. | 358/461 |

FOREIGN PATENT DOCUMENTS 63-211876  9/1988  Japan .
4-100378   4/1992  Japan .

Primary Examiner—Edward L. Coles, Sr.
Assistant Examiner—Fan Lee
Attorney, Agent, or Firm—Foley & Lardner

[57] ABSTRACT

An integrated circuit for processing an analog image signal obtained from a CCD, etc. and converting the processed image signal to a digital image signal. The integrated circuit includes a circuit for adjusting an offset voltage included in the analog image signal, a circuit for sampling/holding the image signal from the adjusting circuit, a variable amplifier for varying an amplitude of the image signal output from the sampling-/holding circuit, an analog/digital converter for converting the image signal from the variable amplifier to a digital signal, and a circuit for detecting a DC component included in the digital image signal and providing the detection result to the adjusting circuit. Correction of a DC voltage component of the analog image signal and amplitude adjustment of the analog image signal can be performed by using a single LSI, and the LSI can be connected to various types of CCDs without using an additional circuit.

16 Claims, 10 Drawing Sheets

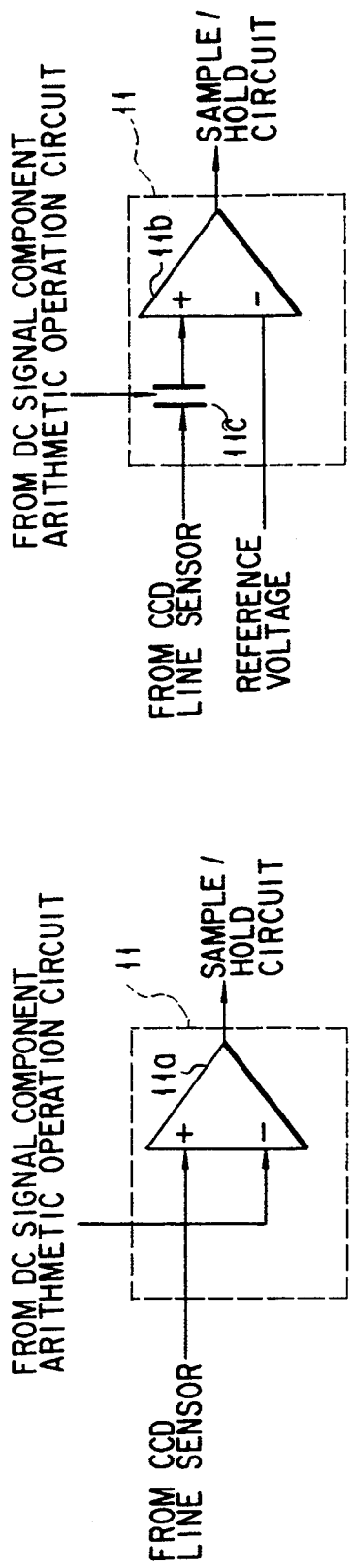
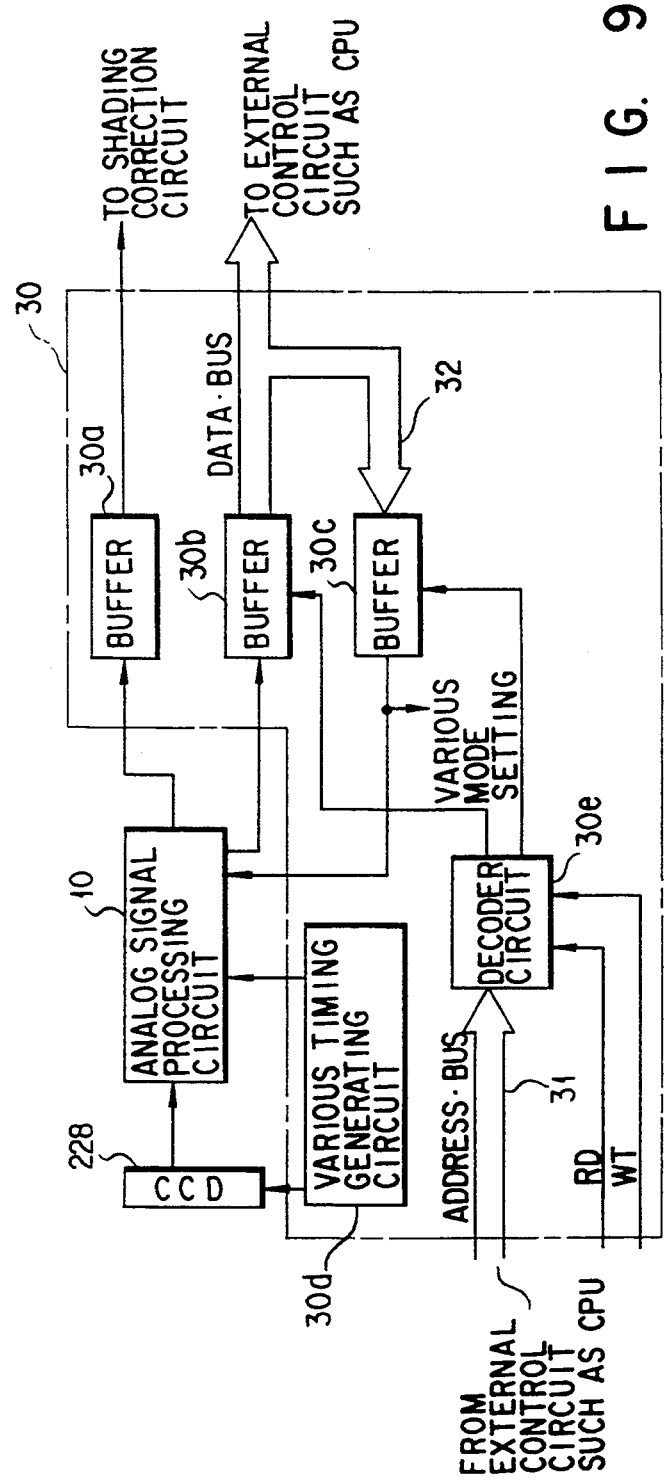

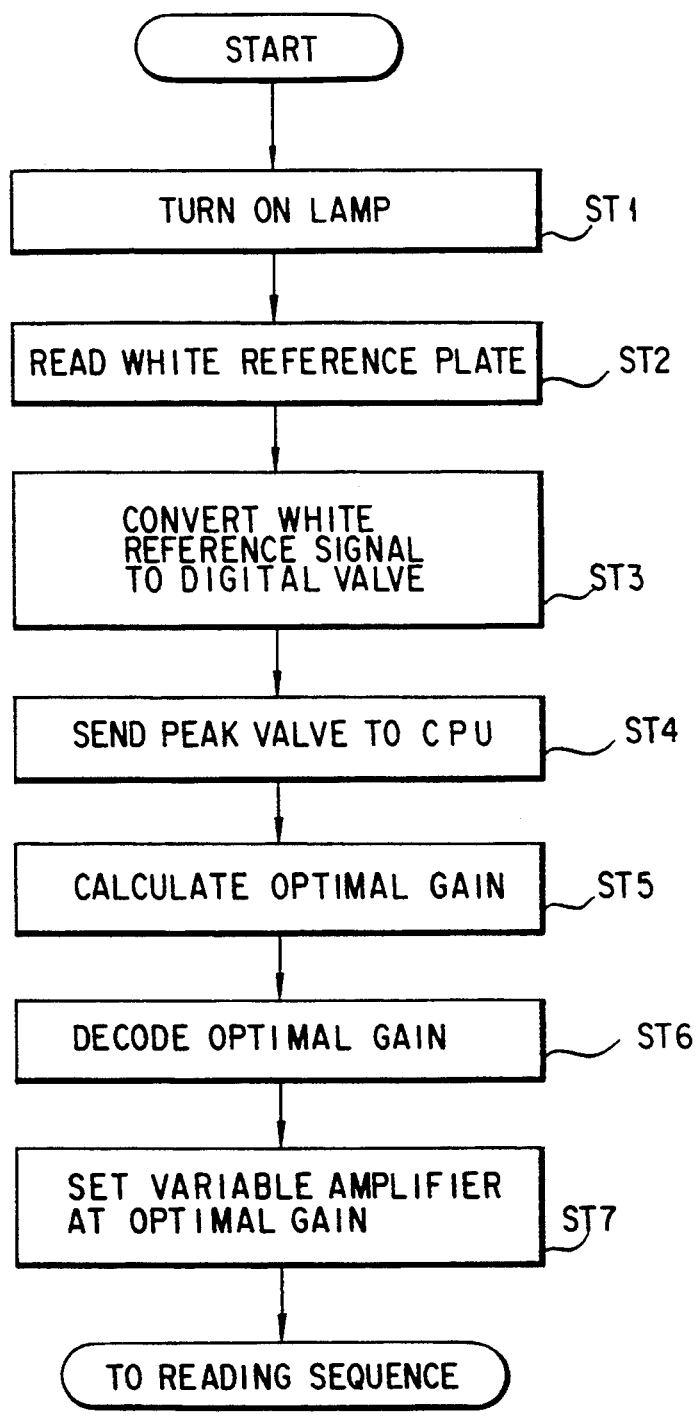
F I G. 10

| CONTROL SIGNAL | | | ATTENUATION AMOUNT (dB) |
| --- | --- | --- | --- |
| ENABLE | Sg1 | Sg0 | |
| 1 | – | – | 0 |
| 0 | 0 | 0 | 0 |
| 0 | 0 | 1 | -2 |
| 0 | 1 | 0 | -4 |
| 0 | 1 | 1 | -6 |
F I G. 11
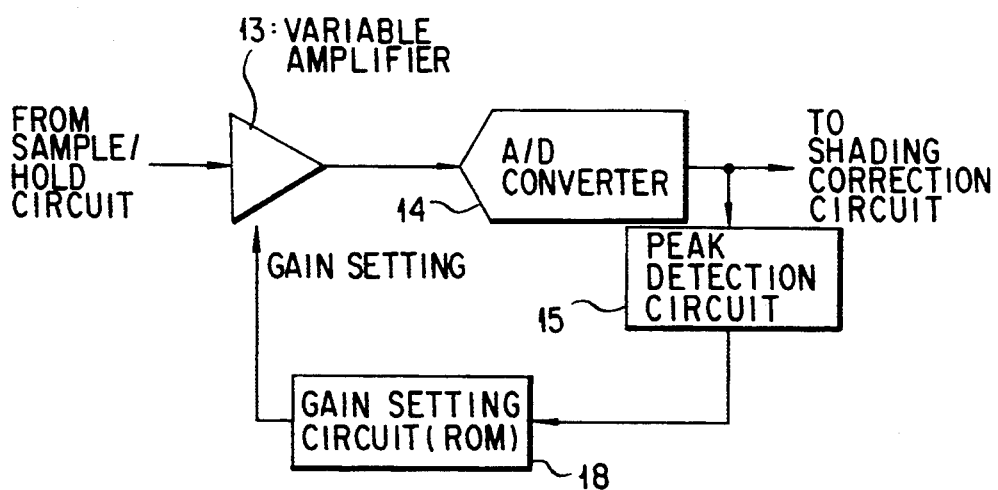
F I G. 12A

INTEGRATED CIRCUIT WITH EXTERIOR GAIN CONTROL ADJUSTMENT

BACKGROUND OF THE INVENTION

1. Field of the Invention

The present invention relates to an image signal processing apparatus for receiving an analog image signal from an apparatus for producing an image signal, such as a CCD (charge coupled device), processing the received image signal, and converting the processed signal to a digital signal, as well as an image reading apparatus for reading image information on an original document by using the image signal processing apparatus and an image forming apparatus for forming an image on the basis of the read image information.

2. Description of the Related Art

Recently, CCDs with photoelectric converter element arrays have been widely used in image reading apparatuses and image reading units in a facsimile apparatus or a digital copying machine. In these apparatuses, a demand for high-speed processing, high-quality image formation, and color image formation has increased more and more, and special attention has been paid to the importance of signal processing for outputs of CCDs. Under the circumstances, various LSIs (large scale integration circuits) for signal processing have been developed. For example, as disclosed in Published Unexamined Japanese Patent Application Nos. 63-211876 and 4-100378, an LSI for image signal processing has been developed, which includes a clamping circuit for adjusting an offset voltage of an analog image signal output from a CCD, a sampling and holding circuit for sampling/holding the respective pixel signals included in the image signal for a predetermined timing, and an A/D converter for converting the sampled/held pixel signals to a digital signal.

In these LSIs, however, fine adjustment of the offset voltage of the clamping circuit, as well as adjustment for attenuating or amplifying a signal amplitude of the analog image signal and optimizing the signal amplitude in an input range of the A/D converter, is manually performed by using a variable resistor, etc. In addition, such adjustment requires a measuring device such as an oscilloscope and, consequently, requires a considerable amount of time. Moreover, such adjustment lacks precision and it is difficult to make the performance of each device after uniform adjustment.

Besides, when CCDs are connected to such a conventional LSI, a certain type of CCD requires an additional circuit. Specifically, two-channel output type CCDs include in-phase output type CCDs wherein a phase difference between output signals of the two channels is 0°, and opposite-phase output type CCDs wherein a phase difference between output signals of the two channels is 180°. When such different types of CCDs are used, a circuit for matching a timing, such as an analog delay line, needs to be provided outside the LSI. In addition, in the case where a CCD which generates a positive-polarity image signal and a CCD which generates a negative-polarity image signal are used, a circuit for inverting the polarity of outputs needs to be provided outside the LSI.

SUMMARY OF THE INVENTION

An object of the invention is to provide an integrated circuit (IC) apparatus for image signal processing, which is capable of automatically adjusting the amplitude of an analog image signal and decreasing as much as possible non-uniformity in adjustment of the respective devices, as well as an image reading apparatus or an image forming apparatus using the IC apparatus.

Another object of the invention is to provide an IC apparatus for image signal processing, which can be connected to different types of CCDs without providing an additional circuit, as well as an image reading apparatus or an image forming apparatus using the IC apparatus.

In order to achieve the above objects, there is provided an integrated circuit apparatus, arranged on a chip, for processing an analog image signal comprising: a circuit for adjusting a DC component included in the analog image signal; a circuit for sampling/holding the image signal from the adjusting circuit; a variable amplifier for varying an amplitude of the image signal output from the sampling/holding circuit; an analog/digital converter circuit for converting the image signal from the variable amplifier to a digital signal; a circuit for outputting the digital image signal to the outside of the apparatus; a circuit for detecting a DC component included in the digital image signal and providing the detection result to the DC component adjusting circuit; and a circuit, connected to an adjusting input of the amplifier, for inputting a signal for adjusting the gain of the amplifier from the outside of the apparatus so that the gain of the amplifier is varied in accordance with the digital signal.

By the above structure, the amplitude of an electrical signal is automatically adjusted within or without an LSI, and the connection mode can be set externally, and the LSI can be connected to various types of CCDs without any additional circuitry.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIGS. 8A and 8B show examples of the structure of a clamping correction circuit according to the invention;

FIG. 9 is a block diagram showing an image signal control circuit;

FIG. 10 is a flow chart illustrating the gain adjustment processing according to the invention;

FIG. 11 shows the relationship between a control signal and attenuation amount according to the invention;

FIGS. 12A and 12B are block diagrams for describing other methods for setting a gain according to the invention.

DETAILED DESCRIPTION OF THE PREFERRED EMBODIMENTS

An embodiment of the present invention will now be described with reference to the accompanying drawings.

Figure 1:
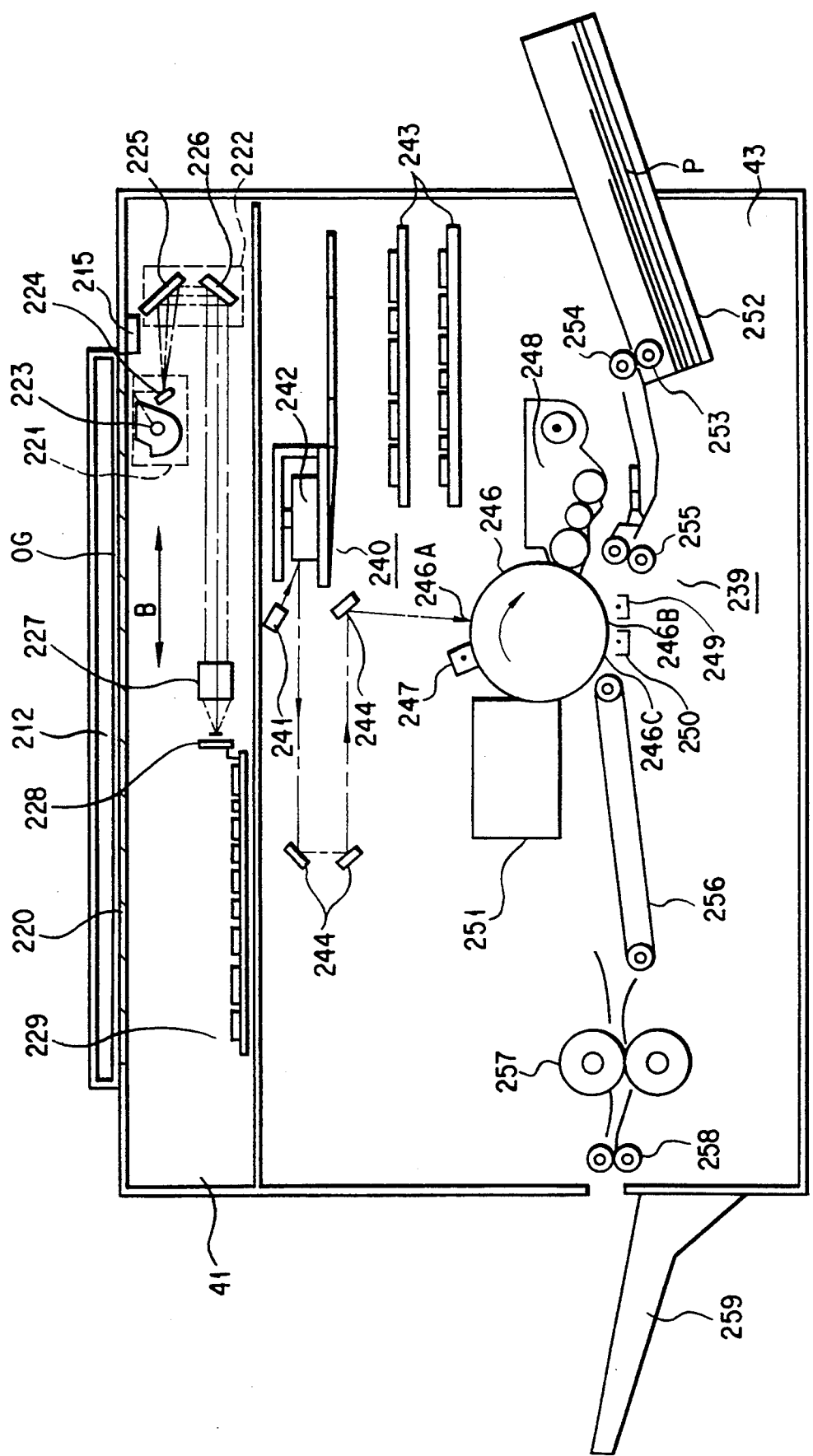
FIG. 1 shows schematically the structure of a digital copying machine using an image processing apparatus according to an embodiment of the present invention.

FIG. 1 shows schematically the structure of a digital copying machine using an LSI according to the present invention.

The digital copying machine comprises a scanner 41 as an image reading apparatus, and a printer 43 as an image forming apparatus. The scanner 41 comprises a first carriage 221 and a second carriage 222 movable in the directions of double-headed arrow B, an image-forming lens 227, a CCD 228, and a control board 229 for electrically/mechanically controlling these parts.

In FIG. 1, an information bearing surface of an original document OG is placed downward on an original document table glass 220. The original document OG is held on the glass 220 by an openable original document hold cover 212. The original document OG is illuminated by a fluorescent lamp 223. Light reflected by the document OG is focused on a light-receiving surface of the CCD 228 having linearly arranged light-receiving elements via mirrors 224, 225 and 226 and image-forming lens 227.

A white reference plate 215 is provided near the original document glass 220. A first carriage 221 comprising the mirror 224, fluorescent lamp 223, a light amount sensor (not shown) for sensing the light amount of the lamp 223, a temperature keeping heater for maintaining a fixed temperature, and a second carriage comprising the mirrors 225 and 226, are moved at relative speeds of 2:1 so as to keep constant the optical path length from the fluorescent lamp 223 to the CCD 228. The first and second carriages 221 and 222 are moved from the right to the left by a stepping motor (not shown) in synchronism with a read timing signal, thus sub-scanning the original document OG.

In the manner described above, the image on the original document OG placed on the glass 220 is read successively in units of a scan line. Accordingly, an output of each photoelectric conversion element corresponding to each pixel of the image is converted by the control board 229 to 8-bit digital image data indicating the image density, and the digital image data is output to the printer 43.

The printer 43 comprises a laser optical system 240, an electrophotographic image forming unit 239 for forming an image on a transfer paper sheet P, and control boards 243 for controlling the operations of the system 240 and unit 239.

The image data read from the original document OG by the scanner 41 is converted to a laser beam signal to be emitted from a semiconductor laser oscillator 241 by use of an image processing circuit (not shown) on the control board 243. The emitted laser beam is shaped by a beam shaping optical system comprising, e.g. a cylindrical lens and is deflected by a polygon mirror 242 rotated by a high-speed motor.

The deflected laser beam is reflected by the mirror 244 through an f$\theta$ lens (not shown), and the reflected beam is focused as a beam spot on an exposure point 246A on a photosensitive drum 246.

The photosensitive drum 246 is surrounded by a charger 247 for charging the surface of the drum, a developing device 248, a transfer charger 249, a separating charger 250, and a cleaner 251. The photosensitive drum 246 is rotated by a driving motor (not shown) at a peripheral drum speed $V_0$, and the drum 246 is charged by the charger 247, which is situated to face the surface of the drum 246 and is provided with a grid electrode.

The laser beam is spot-focused on the exposure point 246A on the charged drum 246. Thus, an electrostatic latent image corresponding to the image data is formed on the photosensitive drum 246. The drum 246 carrying the latent image is rotated to a development point 246B at the speed of $V_0$. At the point 246B, the latent image on the drum 246 is developed by a toner supplied from the developing device 248. The photosensitive drum 246 on which the toner image has been formed is further rotated at speed $V_0$. The toner image on the drum 246 is transferred by the transfer charger 249 onto the transfer paper sheet P fed from a paper feed system at a predetermined timing.

A paper sheet convey mechanism 256, a fixing device 257, paper sheet discharge rollers 258 and a paper sheet discharge tray 259 are provided on the downstream side of the sheet convey path from the transfer charger 249. The transfer paper sheet P on which the toner image has been fixed by the fixing device 257 is discharged to the discharge tray 259 via the discharge rollers 258. Toner remaining on the drum 246, from which the toner image has been transferred onto the sheet P, is removed by the cleaner 251. Then, the drum 246 is restored to the initial state, i.e. the wait state for the next image formation operation.

Figure 2:
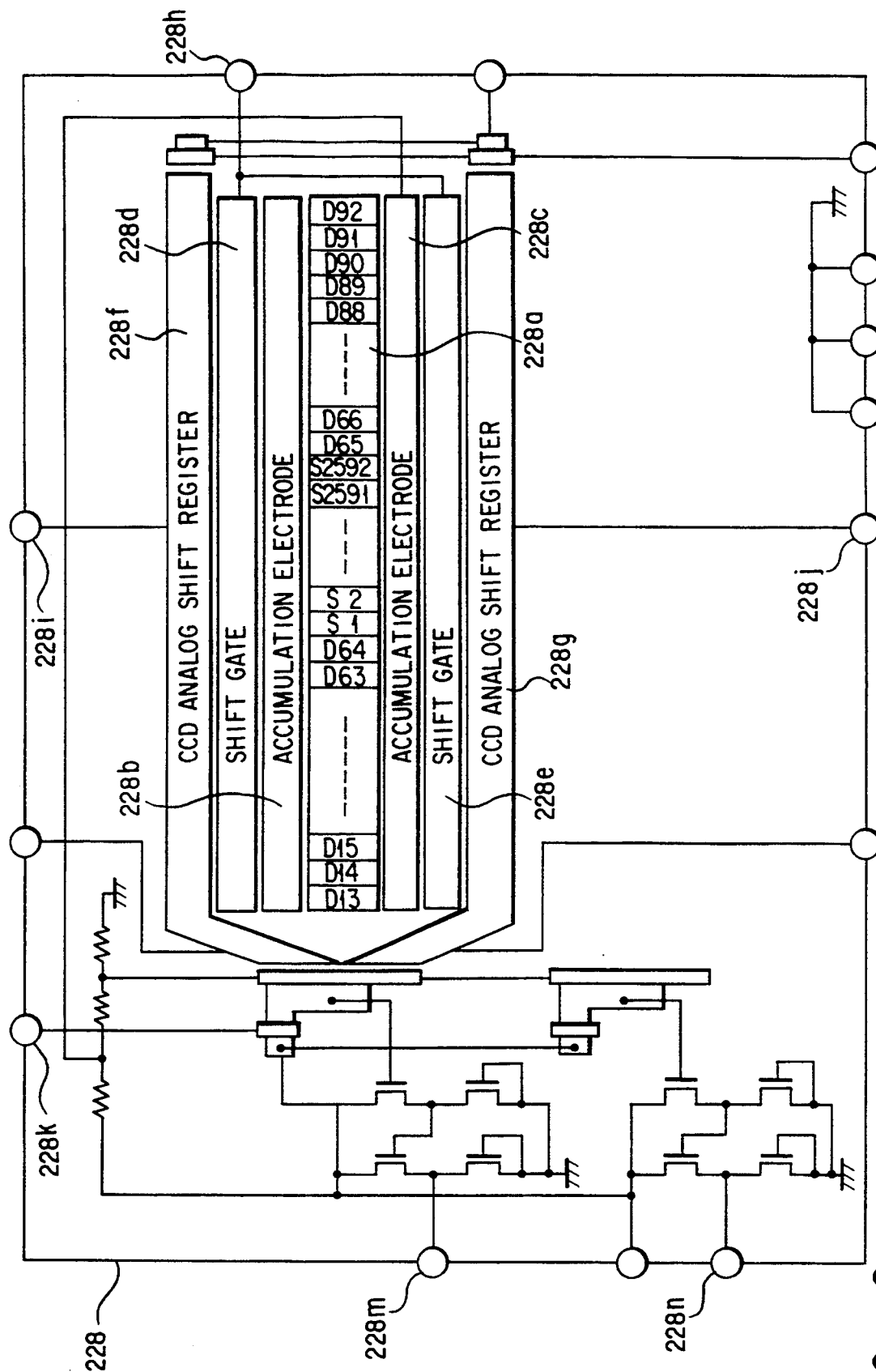
FIG. 2 shows schematically the structure of a two-channel output type CCD.

FIG. 2 shows an example of the structure of a multi-output CCD 228.

The CCD 228 has a photodiode array 228a at a center portion thereof. The photodiode array 228a is sandwiched by accumulation electrodes 228b and 228c, shift gates 228d and 228e, and CCD analog shift registers 228f and 228g.

In the central photodiode array 228a, 5000 elements (photodiodes) S1 to S5000 are used for effective image signals, and front and rear elements D13 to D64 and D65 to D92 are used as dummy elements. The magnification of the optical system including the image-forming lens 227 is determined such that the entire length of the elements S1 to S5000 for effective image signals corresponds to the main scan width on the original document glass 220. For example, according to the apparatus of this embodiment, an original document of "A3" size is read with a resolution of 16 dot/mm. Of the dummy elements D13 to D64, the light-receiving surfaces of the elements (photodiodes) D13 to D29 are covered with an aluminum deposition film for shielding light. These photodiodes are used as reference bits (black reference pixels) for producing a reference voltage of a sensor output.

An input terminal 228h of a gate signal is supplied with a gate pulse signal for transferring a charge of the accumulation electrodes 228b and 228c to CCD analog shift registers 228f and 228g. The cycle of the gate pulse signal coincides with a main-scan cycle and it is called a light accumulation time. Input terminals 228i and 228j of transfer clock signals are supplied with shift clock signals for shifting the charge transferred to the CCD analog shift registers 228f and 228g in the direction of output terminals. A reset signal input terminal 228k is supplied with a reset signal for initializing a floating capacitor voltage at the output stage, and this reset signal is applied to the output gate.

The shift clock signals supplied from the terminals 228i and 228j to the CCD analog shift register 228f and 228g and the reset signal supplied to the terminal 228k are generated in accordance with the respective elements of the 5000 photodiode array 228a. Thereby, image data of each single scan is obtained in a time-sequential manner. Outputs proportional to the charge shifted by the analog shift registers are successively generated from output terminals 228m and 228n of the CCD 28.

Recently, in most of modern CCDs, in order to achieve high-speed shift of output signals, the elements of the photodiode array are divided into even-number-th elements and odd-number-th elements, like the above-described CCD, and thus two or more output channels are provided.

Figure 3A:
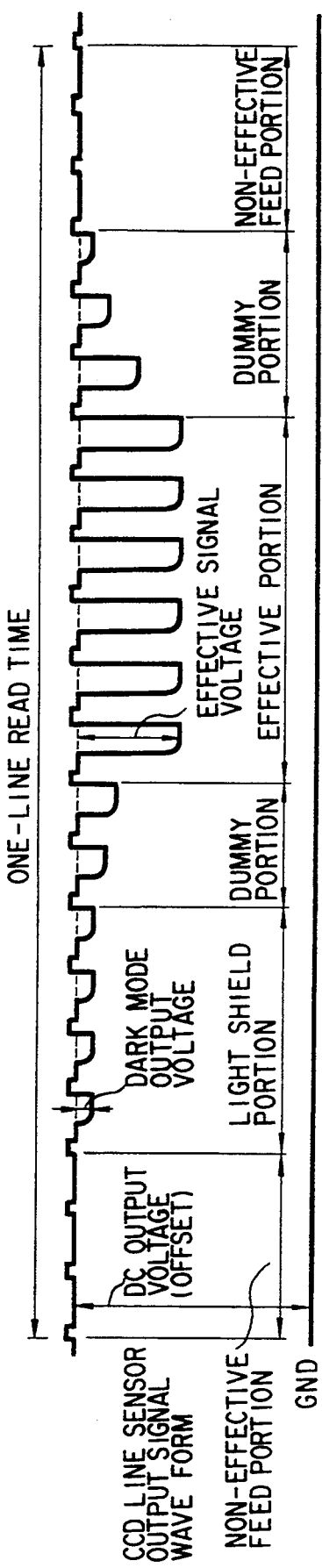
FIGS. 3A and 3B show output signal waveforms of the two-channel output type CCD shown in FIG. 2.
Figure 3B:
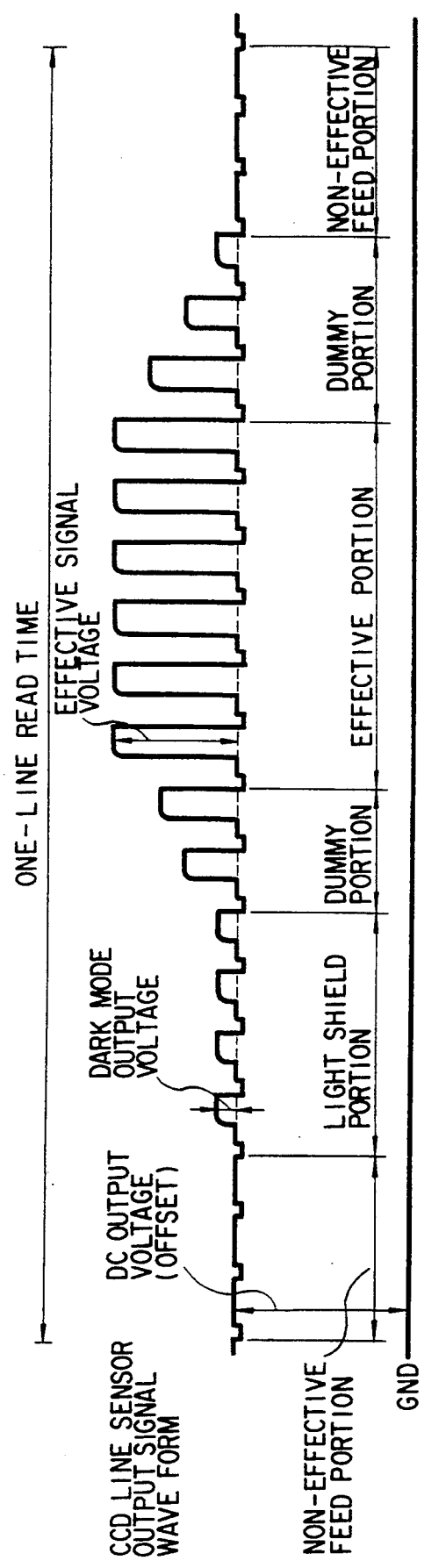

FIGS. 3A and 3B show examples of two output signal waveforms of the CCD 228. In FIG. 3A, an output is offset from OV (GND) by a predetermined DC component, and an analog signal output corresponding to each pixel is generated in a direction toward GND from the offset DC voltage. The CCD generating this type of output signal is referred to as negative output type CCD. In FIG. 3B, an output is offset from 0V (GND) by a predetermined DC component, and an analog signal output is generated in a direction away from GND from the offset DC voltage. The CCD generating this type of output signal is referred to as positive output type CCD.

Figure 4A:
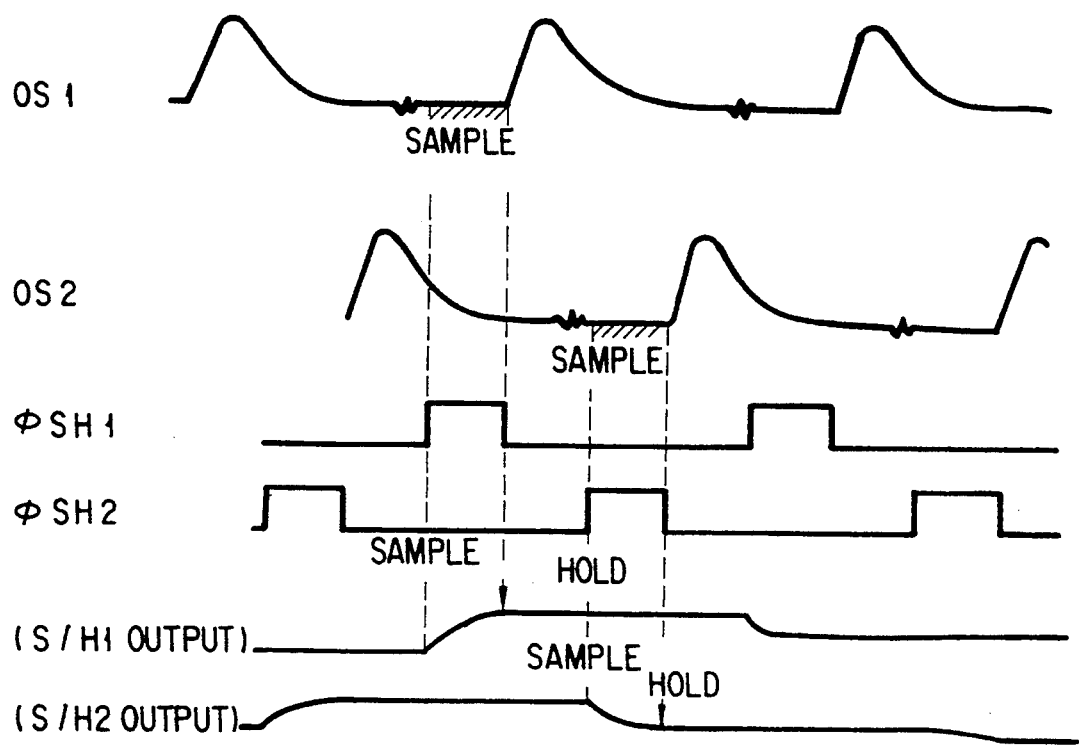
FIGS. 4A and 4B show timings of generation of outputs from the two-channel output type CCD shown in FIG. 2.
Figure 4B:
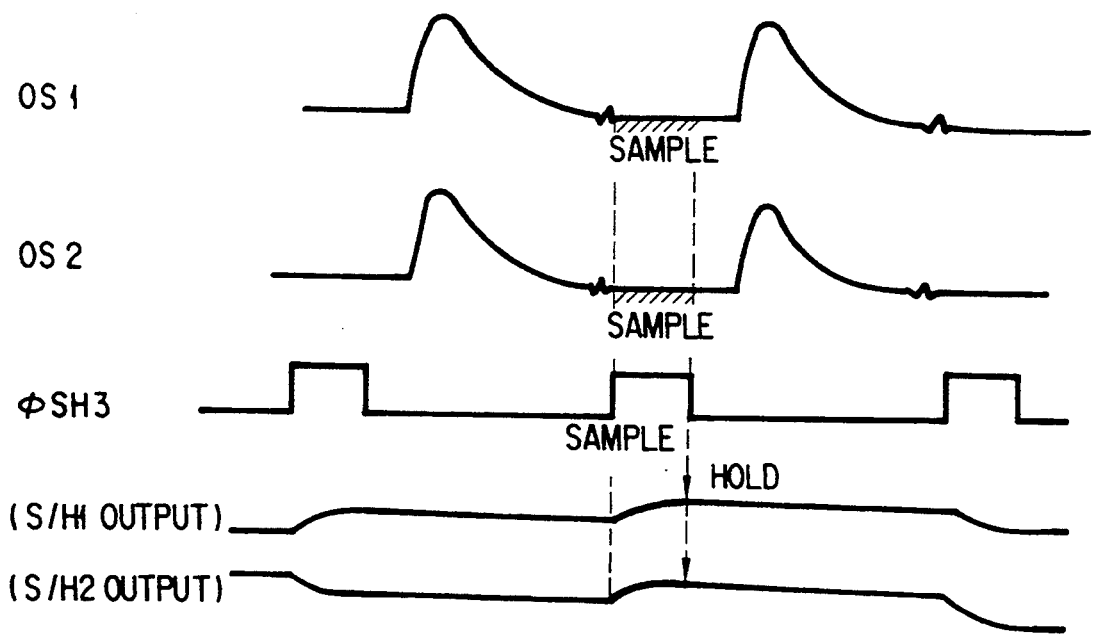

FIGS. 4A and 4B show output timings of the two-channel output type CCD. FIG. 4A shows an output signal waveform in the case where the phases of output signals 0S1 and 0S2 of the two-channel output type CCD are displaced from each other by 180°. The CCD generating this type of signal is referred to as opposite-phase output type CCD. FIG. 4B shows an output signal waveform in the case where the phases of output signals 0S1 and 0S2 of the two-channel output type CCD coincide with each other. The CCD generating this type of signal is referred to as in-phase output type CCD.

As mentioned above, the CCDs can be classified into positive/negative type CCDs and opposite-phase/in-phase type CCDs, with reference to the direction of generated output signals and timing of signal generation. The CCDs of these types can all be used in the image processing apparatus of the present invention.

Figure 5:
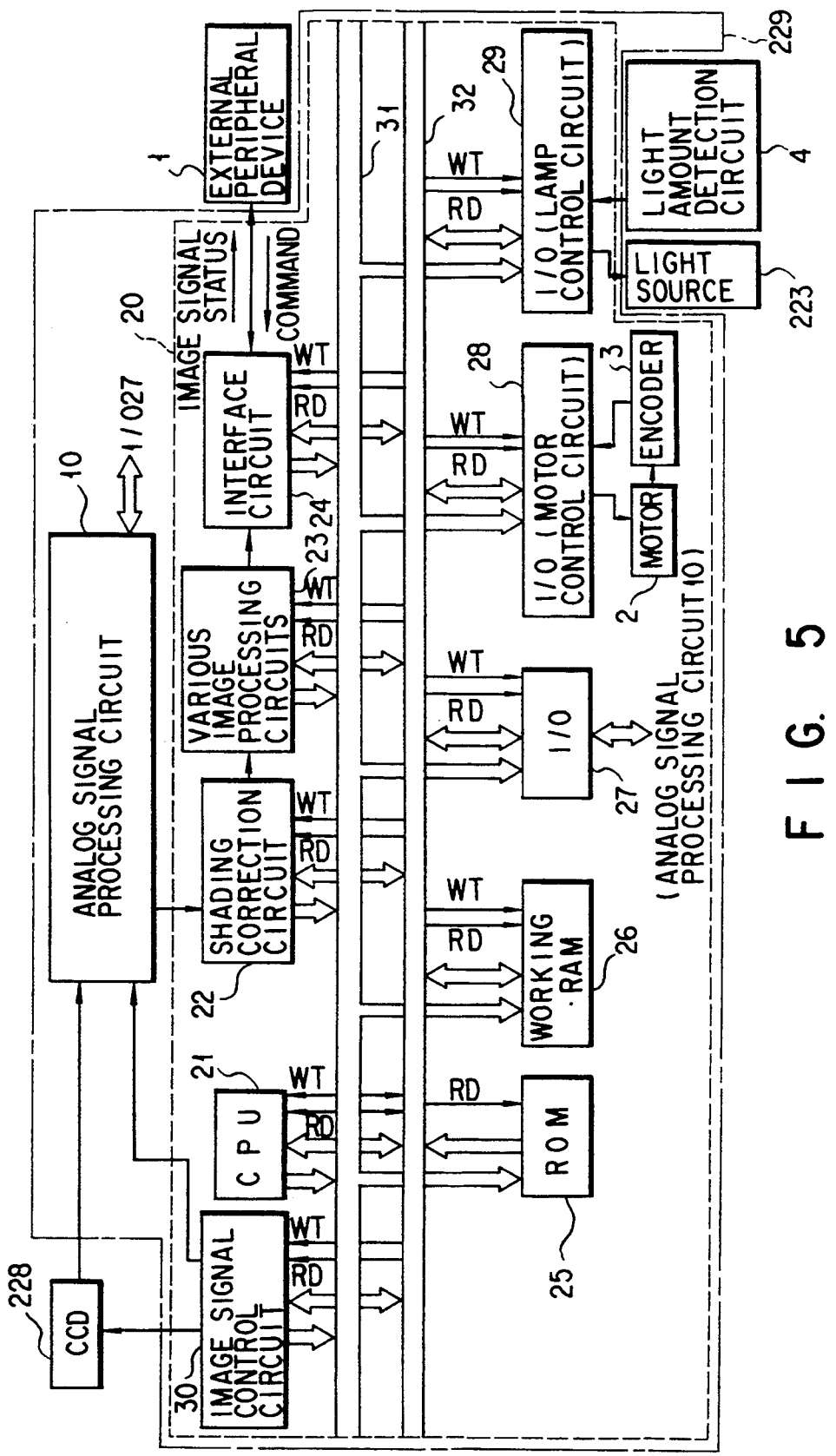
FIG. 5 is a block diagram showing the structure of a control board using the image processing apparatus according to the invention.

FIG. 5 shows a structure of the control board 229 connected to the scanner 41.

The control board 229 comprises an analog signal processing circuit 10 and an image read control unit 20. The image read control unit 20 comprises a CPU 21 for controlling the entire operations of the scanner 41, a shading correction circuit 22, a various image processing circuit 23, an interface circuit 24, a ROM 25, a working RAM 26, input/output (I/O) circuits 27, 28 and 29, and an image signal control circuit 30. These components are connected to each other via an address bus 31 and a data bus 32.

The shading correction circuit 22 has a black shading memory, and a white shading memory each constituted by a RAM. By the black shading data and white shading data (described later) stored in these memories, a variation in sensitivity among photoelectric elements of the CCD line sensor 228 is indicated, a high-frequency distortion in digital image data output from the analog signal processing circuit 10 is corrected, and a shading distortion such as low-frequency distortion of the optical system is corrected.

The various image processing circuit 23 subjects the digital image data, a shading distortion of which has been corrected by the shading correction circuit 22, to image processing such as γ correction or edge emphasis. The interface circuit 24 receives image data from the various image processing circuits 23 and outputs it to an external peripheral device 1 such as a host computer or printer 43. The ROM 25 stores a control program, a data table, etc. for operating the scanner 41. The working RAM 26 stores control data and arithmetic operation data for temporary storage.

The I/O 27 exchanges control signals and information, such as data signals, between the CPU 21 and the analog signal processing circuit 10. The I/O 28 functions as a motor control circuit for controlling the driving of the first and second carriages 221 and 222, between the CPU 21 and a pulse motor 2 and an encoder 3. The I/O 29 functions, between the CPU 21 and a light source 223 of a fluorescent lamp and a light amount detection circuit 4, as lamp control circuit for controlling the on/off and light amount of the fluorescent lamp 223.

The operation of the image read control unit 20 will now be described.

The interface circuit 24 receives various setting commands from the external peripheral device 1 such as a sheet size setting command, a magnification setting command, and a movement setting command. The CPU 21 decodes such commands. Then, the CPU 21 sets the arrangement and operations of parts in the scanner 41, and the associated data is returned as status data to the external peripheral device 1 via the interface circuit 24. Accordingly, the external peripheral device 1 receives the status data and can detect the status of the scanner 1.

The CPU 21 receives an original document read start command from the external peripheral device 1 via the interface circuit 24. Thus, the scanner 41 starts to read the original document OG. Then, the CPU 21 sends an instruction to the analog signal processing circuit 10 via the I/O 27 and accordingly the inside of the processing circuit 10 is set in the predetermined state (the details will be described later).

Subsequently, the CPU 21 sends an instruction to the I/O 28, thereby controlling the driving of the first and second carriages 221 and 222 by means of the motor 2 and encoder 3. At this time, the first carriage 221 is moved such that the mirror 224 is situated below the white reference plate 215.

Then, the CPU 21 sends an instruction to the I/O 29, and while the fluorescent lamp 223 is turned off, the surface image on the white reference plate 215 is focused on the CCD 228 and the image reading is performed. The image data of the white reference plate 215 read by the CCD 228 is stored as black shading data in the black shading memory within the shading correction circuit 22. The black shading data is used as correction data for eliminating a dark level noise inherent to the CCD 228.

After the black shading data has been read, the CPU 21 issues instructions to the I/O 28 and the I/O 29. Specifically, when the fluorescent lamp 223 is turned on and the first carriage 221 is moved under the white reference plate 215 by the motor 2 and encoder 3, the surface image of the white reference plate 215 is focused on the CCD 228 and the image reading is performed. The image data of the white reference plate 215 read by the CCD 228 is stored as white shading data in the white shading memory within the shading correction circuit 22. The white shading data is used as correction data for eliminating a white level noise (high-frequency noise) inherent to the CCD 228 and a shading distortion such as low-frequency distortion of the optical system including the fluorescent lamp 223 and image-forming lens 227.

When the reading of the white shading data has been completed, the first carriage 221 is moved to a location under the original document table glass 220 while the fluorescent lamp 223 is still turned on and the carriage 221 is stopped. The scanner 41 is set in the wait state for a VSYNC command from the external peripheral device 1.

In this state, when the CPU 21 receives the VSYNC command from the external peripheral device 1 via the interface circuit 24, the read scan for the original document OG is started. Specifically, the CPU 21 issues an instruction to the I/O 28, thereby controlling the driving of the first and second carriages 221 and 222 by means of the motor 2 and encoder 3. In this case, when a rotation speed of the motor reaches a predetermined value, the operation mode of the first and second carriages 221 and 222 is switched to the fixed-speed operation mode, and the carriages 221 and 222 are moved under the original document table glass 220 at a predetermined speed. In addition, when the CPU does not receive the VSYNC command from the peripheral device 1 for a predetermined time period (e.g. 3 seconds), the CPU 21 turns off the fluorescent lamp 23 and is set in the wait state for the VSYNC command.

While the first and second carriages 221 and 222 are scanning the original document OG at a predetermined speed, the CCD 228 is then controlled by a horizontal sync signal (the cycle of which is equal to a light accumulation time for driving the CCD) from the image signal control circuit 30. The light signal focused on the light-receiving surface of the CCD is converted to an analog image signal and sent to the analog signal processing circuit 10. The analog image signal is subjected to gain adjustment processing and A/D conversion processing by means of the analog signal processing circuit 10, and the resultant processed signal is sent as digital image data to the shading correction circuit 22. Then, a shading distortion is corrected by the shading correction circuit 22 on the basis of the black shading data and white shading data.

The digital image data, whose shading distortion has been corrected, is subjected to image processing such as γ correction and edge emphasis already set by the various image processing circuit 23, and the original image is reproduced with high fidelity. The processed image data is output to the external peripheral device 1 via the interface circuit 24 and used for the image formation operation by, e.g. the printer 43. In this manner, when the image data read by the CCD 228 is reproduced by the external peripheral device 1, i.e. when the printer 43 forms an image, a reproduced image close to the original image can be output.

In the read region on the original document OG, the operation of the CCD 228 in the longitudinal direction (i.e. main scan direction) and the operation of the carriages 221 and 222 in the movement direction (sub-scan direction) are simultaneously performed, and thereby the image information on the original document OG can be successively read.

When the reading of the original document OG is completed, the CPU 21 sends an instruction to the I/O 28, thereby controlling the driving of the first and second carriages 221 and 222 by means of the motor 2 and encoder 3. Specifically, the first and second carriages 221 and 222 are moved at high speed in a direction opposite to the direction associated with the reading mode. When the first and second carriages 221 and 222 have reached the initial position, the CPU 21 sends a stop instruction to the I/O 28. Thus, the driving of the first and second carriages 221 and 222 is stopped. More specifically, when the CPU 21 receives a read end command from the external peripheral device 1 via the interface circuit 24, the first carriage 221 is stopped in the vicinity of the white reference plate 215.

In addition, the CPU 21 issues an instruction to the I/O 29, and the fluorescent lamp 223 is turned off. Then, the scanner 41 is set in the wait state for the next command from the external peripheral device 1, i.e. the ready state.

Figure 6:
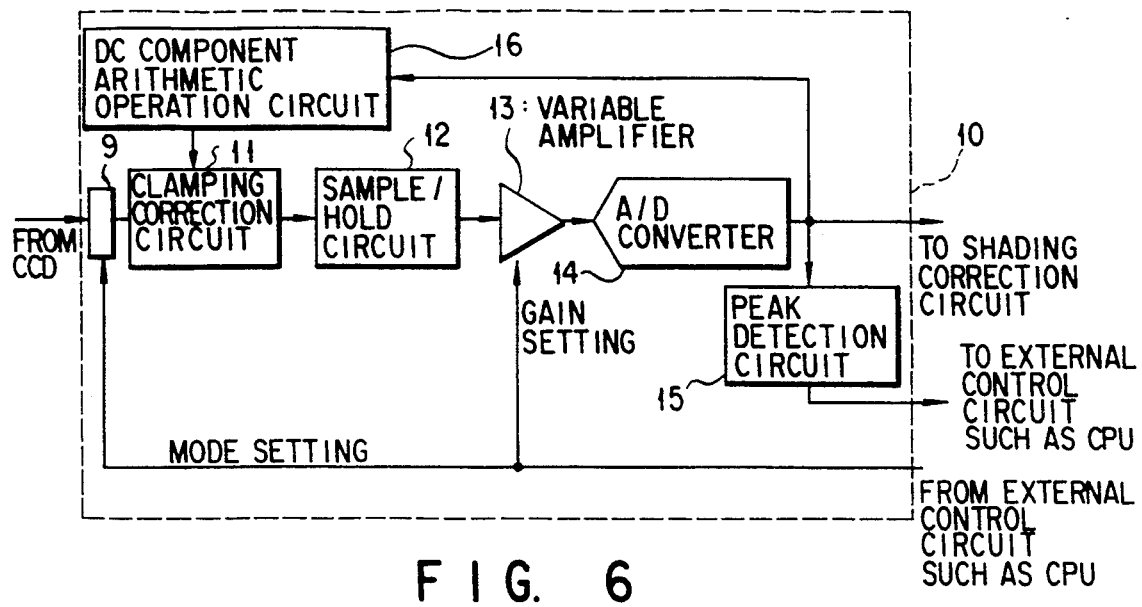
FIG. 6 is a block diagram showing the structure of an analog signal processing circuit (one-channel processing) according to the invention.
Figure 7:
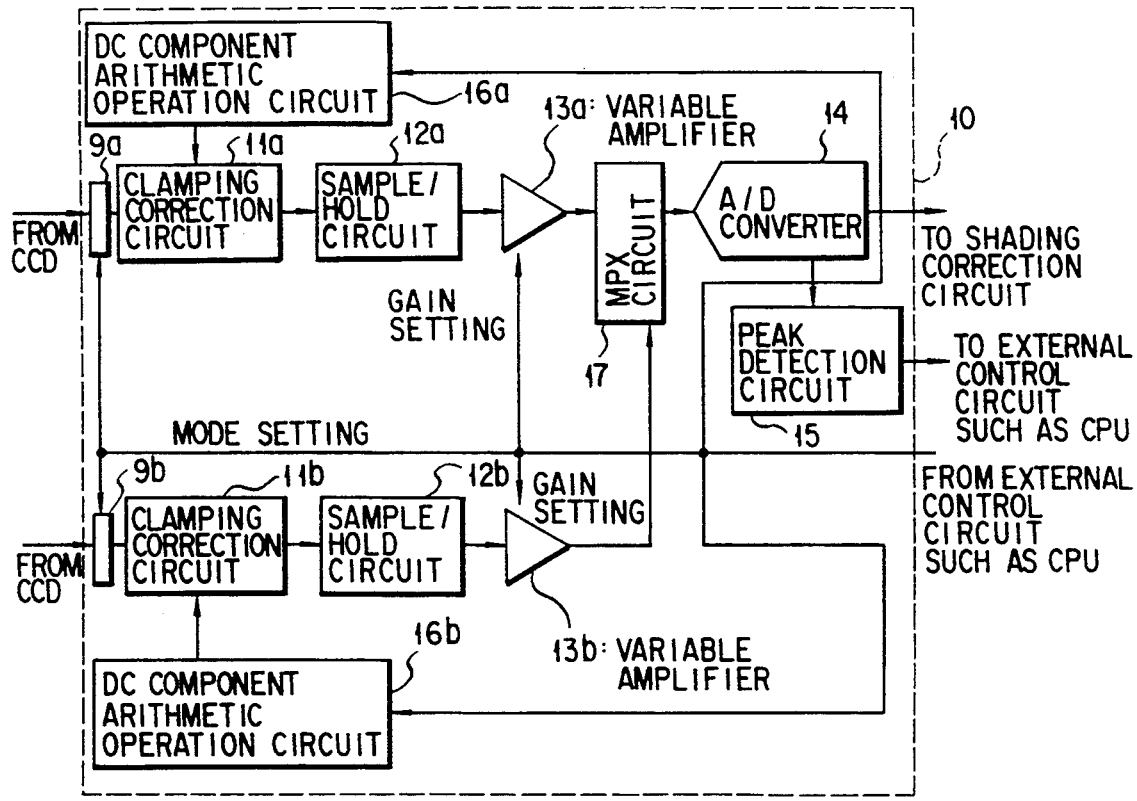
FIG. 7 is a block diagram showing the structure of an analog signal processing circuit (two-channel processing) according to the invention.

FIGS. 6 and 7 show examples of the structure of the analog signal processing circuit (image processing LSI) 10 according to the invention.

FIG. 6 shows an analog signal processing circuit 10 for use in the case of a one-channel (1 ch) output type CCD, and it comprises a mode switch circuit 9, a clamping correction circuit 11, a sample/hold circuit 12, a variable amplifier 13, an A/D converter 14, a peak detection circuit 15, and a DC component arithmetic operation circuit 16.i The mode switch circuit 9 can invert the CCD output in order to match the positive/negative polarity of the output of the connected CCD with the processing mode of the analog signal processing circuit 10. The clamping correction circuit 11 corrects a DC voltage component (offset) of the analog image signal from the CCD 228. The sample/hold circuit 12 samples/holds the output signal from the clamping correction circuit 11. The variable amplifier 13 varies its gain, thereby adjusting the amplitude of the output signal from the sample/hold circuit 12. The gain of the amplifier 13 is varied by a gain setting signal from an external control circuit such as CPU 21 or image signal control circuit 30 within the image read control unit 20. The A/D converter 14 converts an analog output signal from the variable amplifier 13 to a digital signal and outputs the digital signal to the shading correction circuit 22 of the image read control unit 20.

The peak detection circuit 15 detects a peak value of the output signal from the A/D converter 14 and outputs the peak value to the control unit such as CPU 21 or image signal control circuit 30 within the image read control unit 20. The DC component arithmetic operation circuit 16 calculates a DC component according to the digital output value output from the A/D converter 14 and, on the basis of the calculation result, performs fine adjustment of the offset of the image signal processed within the clamping correction circuit 11.

FIG. 7 shows an analog signal processing circuit 10 which is suitably connected to a two-channel (2 ch) output type CCD, and it comprises mode switch circuits 9a, 9b for two channels, clamping correction circuits 11a and 11b for two channels, sample/hold circuits 12a and 12b for two channels, variable amplifiers 13a and 13b for two channels, DC component arithmetic operation circuits 16a and 16b for two channels, an A/D converter 14, a peak detection circuit 15, and an MPX circuit 17.

The MPX (multiplexer) 17 synthesizes output signals from the variable amplifiers 13a and 13b and outputs a synthesized signal to the A/D converter 14. By this construction, two circuit systems are provided between the mode switch circuits and the variable amplifiers. Even if there is a variation in sensitivity, etc. between a system of even-number-th elements and a system of odd-number-th elements of the two-channel output CCD, these systems can be processed independently and such a variation can be corrected. The analog signal processing circuit 10 shown in FIG. 7 can be connected to not only the two-channel output CCD but also the one-channel output CCD. In addition, two analog signal processing circuits shown in FIG. 6 may be used and connected to the two-channel output CCD.

FIGS. 8A and 8B show examples of the structure of the clamping correction circuit 11.

In a circuit shown in FIG. 8A, an output signal level (clamping level) at the time of reading the black shading data is input to a (+) terminal of a differential amplifier 11a, and an output from the DC component arithmetic operation circuit 16 is input to a (−) terminal of the differential amplifier 11a. Thus, the offset voltage of the image signal from the CCD 228 is adjusted to a desired value. In a circuit shown in FIG. 8B, an image signal from the CCD 228 is input to a (+) terminal of a differential amplifier 11b via a coupling capacitor 11c, and a reference voltage is input to a (−) terminal of the differential amplifier 11b. In this case, the (+) terminal of the differential amplifier 11b receives a value obtained by adding the image signal variation component of the CCD 228 to a desired DC component, by the coupling capacitor 11b and a signal from the DC component arithmetic operation circuit.

FIG. 9 shows schematically the structure of the image signal control circuit 30. The image signal control circuit 30 comprises buffers 30a, 30b and 30c, a various timing generating circuit 30d, and a decoder circuit 30e.

The buffer 30a receives an output signal from the A/D converter 14 within the analog signal processing circuit 10 and outputs it to the shading correction circuit 22 within the image read control unit 20. The buffer 30b receives a signal from the peak detection circuit 15 within the analog signal processing circuit 10 and outputs it to the CPU 21 within the image read control unit 20. The buffer 30c receives a mode setting signal and a gain setting signal from the CPU 21, etc. and outputs them to the analog signal processing circuit 10.

The various timing generating circuit 30d generates a horizontal sync signal for driving the CCD 228 and a timing signal for controlling the operation of the analog signal processing circuit 10. The decoder circuit 30e receives an address signal, a write signal WT or a read signal RD from the CPU 21, etc. and outputs control signals for the buffers 30b and 30c.

The basic operation of the LSI circuit according to the present invention will now be described with reference to the analog signal processing circuit (one-channel output type) shown in FIG. 6 by way of example.

The mode of an analog image signal output from the CCD 228 is changed to a suitable one by the mode switch circuit 9 under the control of the CPU21, etc. Specifically, in the case where the image signal from the CCD 228 has the negative polarity and the analog signal processing circuit 10 is constructed for processing positive signals, the mode of the image signal is inverted (and vice versa). Then, the image signal is input to the clamping correction circuit 11 within the analog signal processing circuit 10, and the DC voltage component (offset) contained in the analog image signal is adjusted, as shown in FIGS. 8A and 8B.

The signal output from the clamping correction circuit 11 is an analog signal including reset noise and induction noise. This analog signal is supplied to the sample/hold circuit 12, and an analog signal containing no such noise is generated. The analog signal output from the sample/hold circuit 12 is gain-controlled by the variable amplifier 13 so as to match the input range of the rear-stage A/D converter 14.

The procedure of gain adjustment will specifically be described with reference to FIGS. 10 and 11. The fluorescent lamp 223 is turned on (ST1) and the white reference plate 215 is read (ST2). The output signal from the CCD 228 at this time is converted to a digital image signal by the A/D converter 14 (ST3). The peak value of the digital image signal is detected by the peak detection circuit 15 and the detected peak value is sent to the CPU 21 (ST4). The CPU 21 compares the received peak value with the current gain value of the variable amplifier 13 stored in the working RAM 26, and determines an optimal gain (ST5). The optimal gain is sent to the decoder circuit 30e within the image signal control circuit 30. The gain from the CPU 21 consists of three bits (enable, Sg1, Sg2) as shown in FIG. 11, and the decoder circuit 30e decodes the optimal gain (ST6). The decoded gain is transmitted to the analog signal processing circuit 10, and the gain of the variable amplifier 13 is set to the optimal value (ST7). In this way, the level of the image signal output from the variable amplifier 13 is made to coincide with the optimal input level of the A/D converter 14.

In general, in the case where the original document OG is read at a low speed, the output amplitude of the CCD 228 is large and therefore the gain is decreased. On the other hand, where the document OG is read at a high speed, the output amplitude of the CCD 228 is small and therefore the gain is increased. Although the control signal for gain setting is indicated by three bits, the number of bits may be increased to increase the attenuation amount or amplification amount, or to perform fine gain setting.

Figure 12B:
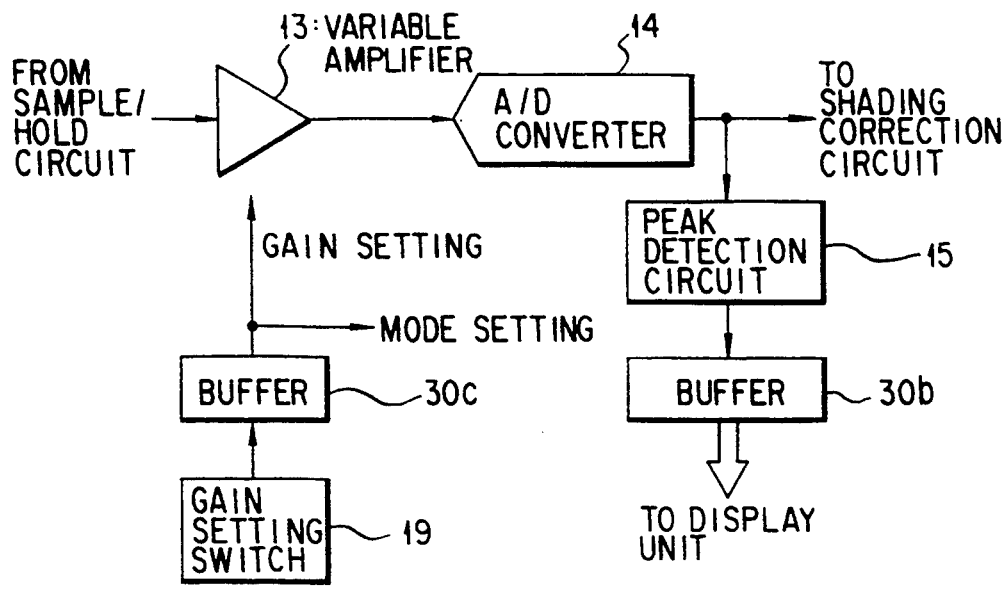

As has been described above, according to this embodiment, the CPU 21 determines the optimal gain of the variable amplifier 13. According to other embodiments, circuit .constructions as shown in FIGS. 12A and 12B are useful. In FIG. 12A, the peak value from the peak detection circuit 15 is input to the ROM including a look-up table, and a suitable gain value corresponding to the peak value is output to the variable amplifier 13. Thereby, the gain of the variable amplifier 13 is set to a suitable value. The ROM can be provided within the analog signal processing circuit (LSI) 10. In FIG. 12B, the peak value from the peak detection circuit 15 is output to a display unit such as an indicator or display (not shown) via a buffer 30b. On the basis of the displayed value, the operator manually operates an external gain setting circuit 19 constituted by a dip switch, etc., and thus the gain of the variable amplifier 13 is set.

Referring back to FIG. 6, the signal output from the variable amplifier 13 is supplied to the A/D converter 14 and converted to a digital signal and then to the peak detection circuit 15, DC component arithmetic operation circuit 16 and the shading correction circuit 22 the image read control unit 20. The shading-corrected digital image signal is delivered to the external peripheral device 43 (printer), and an image is formed.

Since the gain of the variable amplifier 13 in the image processing LSI for processing the analog output signal from the CCD is automatically adjusted within or without the LSI, as described above, quick and stable adjustment can be performed. Moreover, since the various modes can be set within the LSI, different types of CCDs can easily be connected without modifying the circuit configuration or providing an external circuit. In the above embodiment, the image processing LSI is formed in a one-chip structure. However, the image processing LSI may be formed in two or more chips, for example, with individual functions assigned to them.

Figure 13:
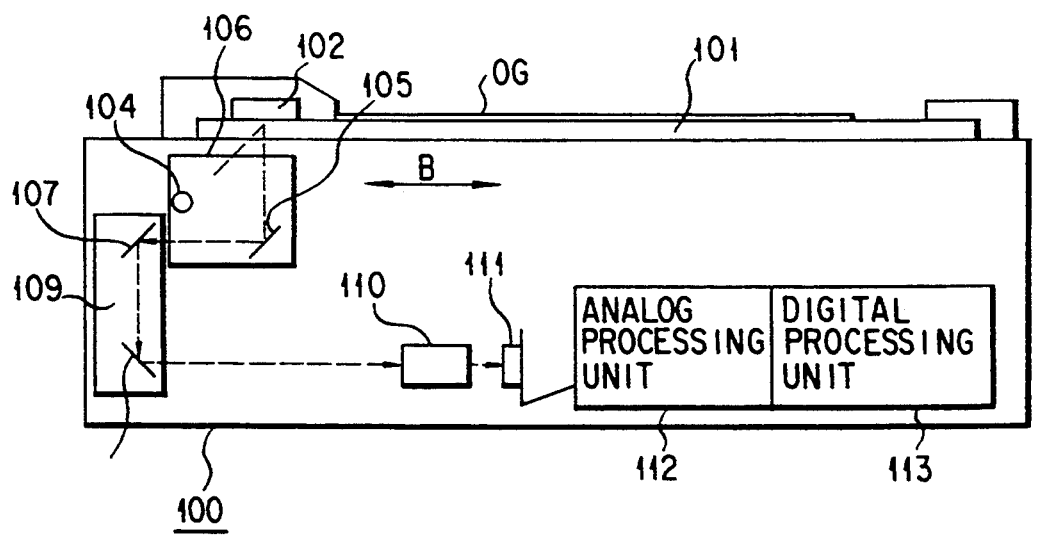
FIG. 13 shows the structure of a scanner apparatus according to another embodiment of the invention.

The present invention can be applied not only to the digital copying machine but also a facsimile apparatus, a scanner apparatus, etc. FIG. 13 shows a scanner apparatus 100 to which the image processing LSI of the present invention has been applied.

The scanner apparatus 100 comprises an original document glass 101 on which an original document OG is set, a white reference plate 102, a first carriage 106 having a light source 104 and a mirror 105, a second carriage 109 having first and second mirrors 107 and 108, a focusing lens 110, a CCD 111 serving as photoelectric conversion element, an analog processing unit (image processing LSI) 112 functioning as analog signal processing circuit, and a digital processing unit 113 functioning as image read control unit. The scanner apparatus 100 reads the original document image by substantially the same operation and control as the scanner 41 of the above-described digital copying machine.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A device for processing an analog image signal supplied from a CCD sensor, comprising:
   1) an integrated semiconductor device including:
      (a) sample-and-hold means for executing a sample-and-hold operation on the analog image signal;
      (b) amplifying means for adjusting the gain of an output from the sample-and-hold means;
      (c) converting means for executing an analog-to-digital conversion on an output from the amplifying means and outputting a digital image signal; and
      (d) peak detecting means for detecting a peak value of said digital image signal output from the converting means; and
   2) look up table means for generating the optimal gain of said amplifying means in response to the peak value detected by said peak detecting means, and setting the gain of said amplifying means by using the generated optimal gain.

2. An apparatus for processing an analog image signal supplied from a CCD sensor, comprising:
   an integrated semiconductor device including as components therein:
      (a) sample-and-hold means for executing a sample-and-hold operation on the analog image signal;
      (b) amplifying means for adjusting the gain of an output from the sample-and-hold means;
      (c) converting means for executing an analog-to-digital conversion on an output from the amplifying means and outputting a digital image signal; and
      (d) peak detecting means for detecting a peak value of said digital image signal output from the converting means; and
   display means, provided exterior to said semiconductor device, for displaying a peak value detected by said peak detecting means; and
   switching means, provided exterior to said semiconductor device, for setting the gain of said amplifying means.

3. A apparatus for processing an analog image signal supplied from a CCD sensor, comprising:
   an integrated semiconductor device including as components thereof:
      (a) sample-and-hold means for executing a sample-and-hold operation on the analog image signal;
      (b) amplifying means for adjusting the gain of an output from the sample-and-hold means;
      (c) converting means for executing an analog-to-digital conversion on an output from the amplifying means and outputting a digital image signal; and
      (d) peak detecting means for detecting a peak value of said digital image signals output from the converting means; and
   adjusting means external to the integrated semiconductor device, for adjusting the amplifying means in accordance with the peak value detected by the peak detecting means, the adjusting means having means for determining an optimal gain of the amplifying means on the basis of the peak value detected by the peak value detecting means and means for setting the gain of the amplifying means on the basis of the optimal gain determined by the determining means.

4. The apparatus according to claim 3, wherein said semiconductor device further includes means for clamping a DC component included in the analog image signal supplied from the CCD sensor, and means for detecting the DC component included in an output from the converting means and providing the detection result to the DC component clamping means.

5. The apparatus according to claim 4, wherein said DC component clamping means includes differential amplifying means, one input of the differential amplifying means receiving the detection result of the DC component detection means, the other input thereof receiving said analog image signal, and an output thereof being connected to an input of said sample-and-hold means.

6. The apparatus according to claim 3, wherein said integrated semiconductor device includes a plurality of said sample-and-hold means, a plurality of said amplifying means and in order to process signals from a multichannel CCD, and also includes multiplex means for multiplexing output signals from said plurality of amplifying means and inputting the mulitiplexed signals to the analog-to-digital converting means.

7. The apparatus according to claim 3, further comprising:

means for matching various signal modes of the input analog image signal with an image signal processing mode of said apparatus, thus enabling said apparatus to process various analog image signals.

8. An image reading apparatus comprising:

means for reading an image of an original document, said reading means including a CCD sensor for supplying an analog image signal corresponding to the image of the original document;

an integrated semiconductor device including as components thereof:
(a) sample-and-hold means for executing a sample-and-hold operation on the analog image signal;
(b) amplifying means for adjusting the gain of an output from the sample-and-hold means;
(c) converting means for executing an analog-to-digital conversion on an output from the amplifying means and outputting a digital image signal; and
(d) peak detecting means for detecting a peak value of said digital image signal output from the converting means; and adjusting means external to the semiconductor device for adjusting the amplifying means in accordance with the peak value detected by the peak means, the adjusting means having means for determining the optimal gain of the amplifying means on the basis of the peak value detected by the peak detecting means, and means for setting the gain of the amplifying means on the basis of the optimal gain determined by the determining means.

9. The image reading apparatus according to claim 8, wherein said image reading apparatus further includes means for displaying the peak value.

10. The image reading apparatus according to claim 8, wherein said integrated semiconductor device further includes means for clamping a DC component included in the analog image signal supplied from the CCD sensor, and means for detecting the DC component included in an output from the converting means and providing the detection result to the DC component clamping means.

11. The image reading apparatus according to claim 10, wherein said DC component clamping means of the semiconductor device includes differential amplifying means, one input of the differential amplifying means receiving the detection result of the DC component detection means, the other input thereof receiving said analog image signal, and an output thereof being connected to an input of said sample-and-hold means.

12. The image reading apparatus according to claim 8, said semiconductor device further comprising:

means for matching various signal modes of the input analog image signal with an image signal processing mode of said apparatus, thus enabling said device to process various analog image signals.

13. The image reading apparatus according to claim 8, wherein said integrated semiconductor device includes a plurality of said sample-and-hold means and a plurality of said amplifying means, in order to process signals from a multi-channel CCD, and also includes multiplex means for multiplexing output signals from said plurality of amplifying means and inputting the multiplexed signals to the analog-to-digital converting means.

14. An image forming apparatus for forming an image on an image bearing member, comprising:

means for reading an image of an original document, said reading means including a CCD sensor for supplying an analog image signal corresponding to the image of the original document;

an integrated semiconductor device having components therein including:
(a) sample-and-hold means for executing a sample-and-hold operation on the analog image signal;
(b) amplifying means for adjusting the gain of an output from the sample-and-hold means;
(c) converting means for executing an analog-to-digital conversion on an output from the amplifying means and outputting a digital image signal; and
(d) peak detecting means for detecting a peak value of said digital image signal output from the converting means; and adjusting means external to the semiconductor device, for adjusting the amplifying means in accordance with the peak value detected by the peak value detecting means, the adjusting means having means for determining an optimal gain of the amplifying means on the basis of the peak value detected by the detecting means, and means for setting the gain of the amplifying means on the basis of the optimal gain determined by the determining means; and forming means for forming an image on the image bearing member based on the digital image signal converted by the converting means.

15. The image forming apparatus according to claim 14, wherein said integrated semiconductor device further comprises means for storing the peak value, and interface means for outputting the peak value to said adjusting means of said apparatus, wherein said adjusting means calculates a gain of the simplifying means on the basis of the peak value, and the calculated result is input to the amplifying means via the interface means.

16. The image forming apparatus according to claim 14, wherein said integrated semiconductor device includes a plurality of said sample-and-hold means and a plurality of said amplifying means, in order to process signals from a muti-channel CCD, and also includes multiplex means for multiplexing output signals from said plurality of amplifying means and inputting the multiplexed signals to the analog-to-digital conversion means.

* * * * *